350-6.91      SR
XR  4,058,831

United States TX350-6.91

Smith 4,058,831

Nov. 15, 1977

[54] PANORAMIC CAMERA SCANNING SYSTEM

[75] Inventor: William V. Smith, Memphis, Tenn.

[73] Assignee: Lectrolarm Custom Systems, Inc., Memphis, Tenn.

[21] Appl. No.: 721,502

[22] Filed: Sept. 8, 1976

[51] Int. Cl.² ............................................. H04N 5/24
[52] U.S. Cl. ....................................... 358/87; 350/7;
           350/289; 350/300; 354/95; 358/108
[58] Field of Search ...................... 358/87, 88, 89, 93,
       358/100, 108, 206, 210, 225, 226, 229; 350/7,
                                      285, 289, 300; 354/95

[56] References Cited

U.S. PATENT DOCUMENTS

| | | | |
|---|---|---|---|
| 1,660,886 | 2/1928 | Randall | 358/210 |
| 2,905,758 | 9/1959 | Walker | 358/87 |
| 3,040,123 | 6/1962 | Hellings | 358/87 |
| 3,256,387 | 6/1966 | Beste | 358/87 |
| 3,335,217 | 8/1967 | Bassett | 358/88 |
| 3,629,592 | 12/1971 | Courrier | 350/7 |
| 3,780,224 | 12/1973 | Levine | 358/87 |
| 3,881,811 | 5/1975 | French | 350/289 |
| 3,976,837 | 8/1976 | Lang | 358/250 |

*Primary Examiner*—Howard W. Britton
*Attorney, Agent, or Firm*—Watson, Cole, Grindle & Watson

[57] ABSTRACT

Panoramic camera scanning system including a rotating mirror system which enables scanning through a full 360° revolution. The mirror system includes a planar mirror member having reflective coatings on both of its surfaces. This planar member is mounted so as to extend along an axis in a direction substantially perpendicular to the optical axis of a camera utilized within the scanning system. By rotating the planar member, a full 360° scanning view can be provided to the camera without requiring any movement of the camera.

10 Claims, 8 Drawing Figures

PANORAMIC CAMERA SCANNING SYSTEM

BACKGROUND OF THE INVENTION

The present invention is concerned with providing a panoramic scanning system which is capable of scanning through a full 360° revolution.

A primary utilization of such a scanning system is with a closed circuit television camera such as utilized for surveilance purposes within stores and banks today. The purpose of such a system is to enable a wider area to be viewed than generally possible with conventional systems generally utilized. In most conventional systems, in order to provide a scanning effect the entire camera must be rotated through the desired scanning angle. Typically the camera is placed against the wall with the camera rotating back and forth along the same path so that the scanning angle is less than 360°.

Several systems have been developed for enabling a panoramic view over a full 360° revolution to be obtained. In developing these systems, there has been concern for avoiding the necessity of having to rotate the entire camera housing. Such systems are illustrated in the following U.S. Pats.: No. 2,905,758 issued to J. P. Walker; No. 3,610,825 issued to B. G. Fritzel; No. 3,634,622 issued to B. A. Wheeler; and No. 3,761,623 issued to A. Hara et al.

In the systems disclosed by all of these patents, a mirror member having a single reflective surface is arranged at an angle with respect to the optical axis of the camera. While the reflective surface of the mirror continuously faces the optical axis, the mirror is rotated through a full 360° revolution. In this manner, a panoramic scanning view can be obtained. In order to maintain the image being viewed by the camera in the same orientation throughout the entire rotation of the mirror assembly, however, the camera head itself is simultaneously rotated in synchronism with the mirror. In order to rotate the camera itself along with the mirror, the drive motor must provide a relatively large torque due to the weight of the camera. Furthermore, it is generally considered to be desirable to try to maintain the camera in a stationary position if at all feasible.

SUMMARY OF THE INVENTION

An object of the present invention is to provide a mirror system for utilization within a panoramic scanning system which is capable of providing a scanning view through a full 360° revolution without requiring any movement of the camera itself.

Another object of the present invention is to provide a panoramic camera scanning system in which the camera can be held in a stationary orientation while still being capable of scanning through a full 360° revolution.

A further object of the present invention is to provide a panoramic scanning system in which the images obtained remain in the same orientation with respect to the vertical axis throughout the entire operation.

In order to accomplish these objectives, the panoramic camera scanning system utilizes a mirror system which includes a planar mirror member having reflective coatings on both of its planar surfaces. A mounting bracket is provided for rotatably mounting the planar member such that its plane lies along an axis extending in a direction substantially perpendicular to the optical axis of the camera of the panoramic scanning system. During operation, the planar member is then rotated about the mounting axis. In utilizing this system, the lens of the camera if focused on the planar member so that as the member is rotated a panoramic scanning view is transmitted to the camera.

In utilizing the mirror system within the panoramic camera scanning system, the planar member is spaced only a short distance from the lens of the camera. It is preferable that the lens of the camera be a wide-angled lens. With a wide-angled lens, a wider field of view can be obtained at all times from the reflection off the mirror. This is especially true when the plane of the mirror is perpendicular to the optical axis of the camera, i.e., one of the planar surfaces directly faces the camera lens. Furthermore, with a wide-angled lens, when the plane of the planar member is aligned with the optical axis of the camera it will not present any impediment to the optical view of the camera.

The camera in this system is adjustably mounted on a mounting bracket, which is attached to the mounting bracket for the mirror system. In this manner, the camera can be adjusted so as to be moved along its optical axis relative to the planar mirror member thereby allowing for adjusting the view to be obtained from the reflective surfaces of the planar member.

DESCRIPTION OF THE PREFERRED EMBODIMENT

Figure 1:
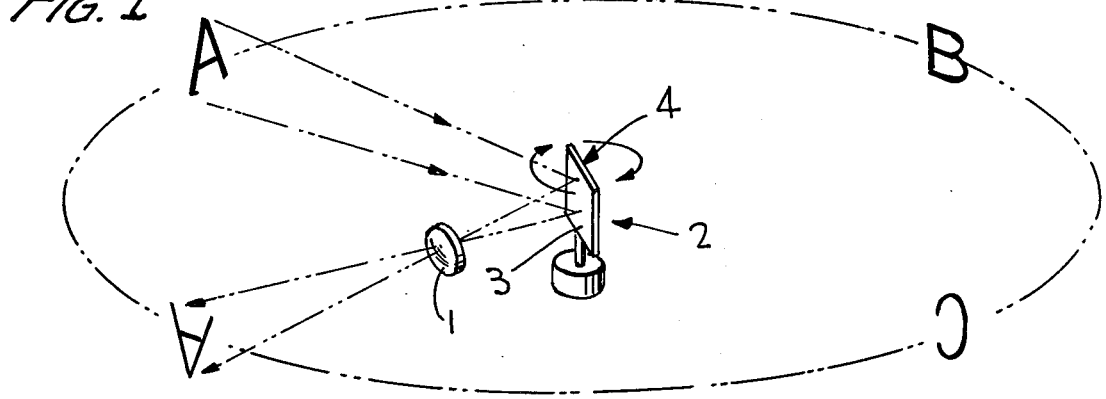
FIGS. 1 through 3 schematically illustrate the operation of the system of the present invention.
Figure 2:
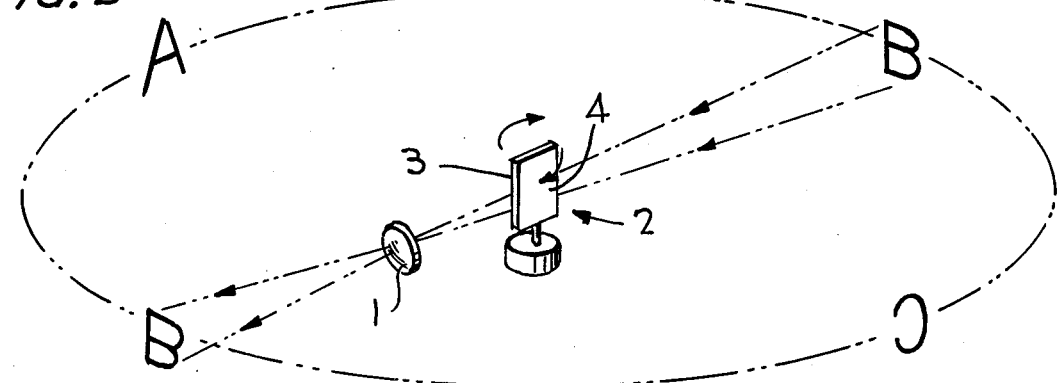
Figure 3:
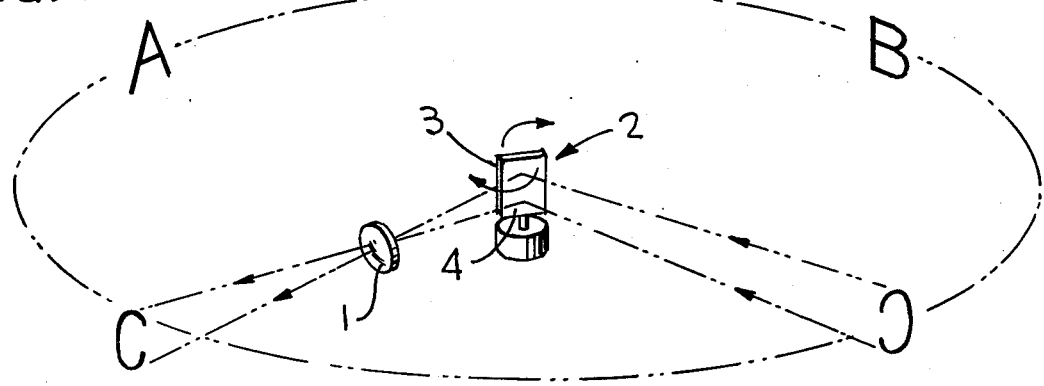

The operation of the system of the present invention can be understood through the schematic illustrations shown in FIGS. 1 through 3. The panoramic camera scanning system includes a camera schematically represented by lens 1 and a planar mirror having reflective surfaces 3 and 4. Planar mirror 2 extends along and is rotatable about an axis which is perpendicular to the optical axis of lens 1.

When the mirror is in the position shown in FIG. 1, an image of an object at the position designated A is reflected by surface 3 and then viewed by the camera through lens 1. When the mirror has been rotated to the position shown in FIG. 2, mirror member 2 does not impede the view of lens 1 which is then able to see an object at the position designated B. In this situation, the impediment caused to the view of the camera by mirror member 2 is minimized by utilizing a wide-angled lens with the camera. Next, when the mirror member has been further rotated to the position shown in FIG. 3, an image of an object at the location designated C is reflected by surface 4 and then viewed by the camera through lens 1. Finally, when mirror member 2 is still further rotated so as to face lens 1, the camera would then view any object positioned behind it. Since planar mirror 2 continues to rotate in the same direction, the cycle is continuously repeated. Thus for each single revolution of the mirror, two complete panoramic scans are provided.

Figure 4:
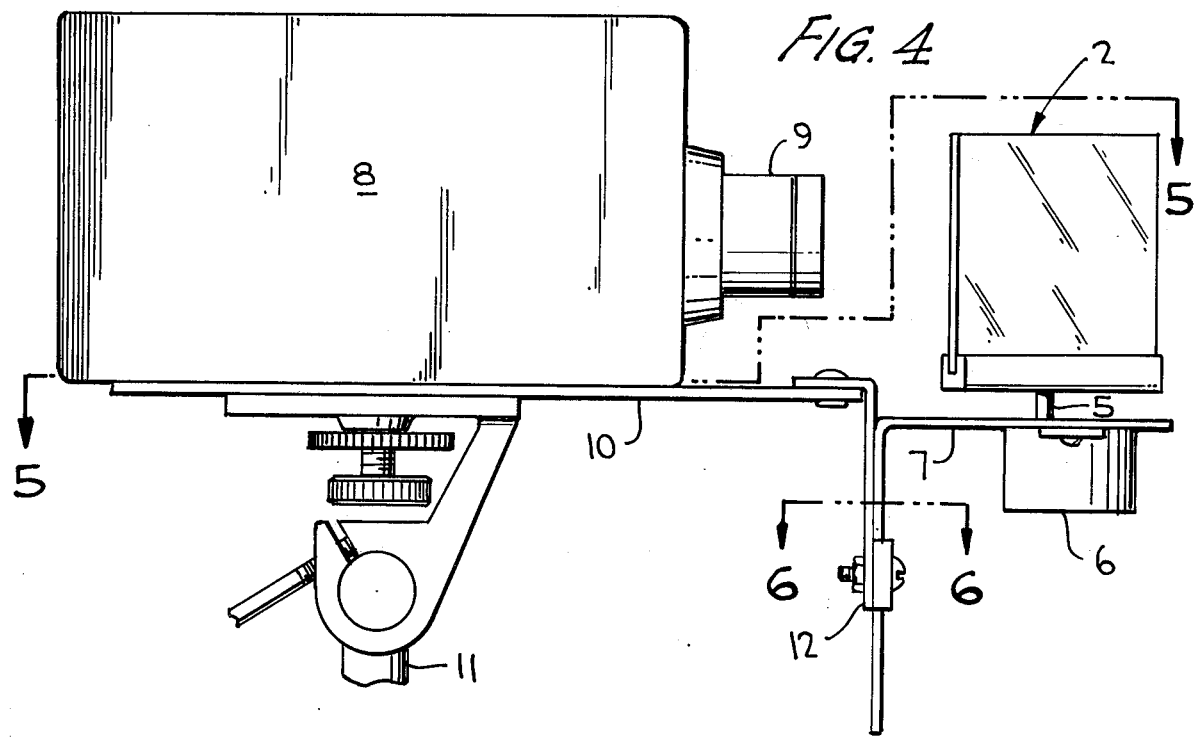
FIG. 4 is a side-elevational view of the panoramic camera scanning system of the present invention.
Figure 5:
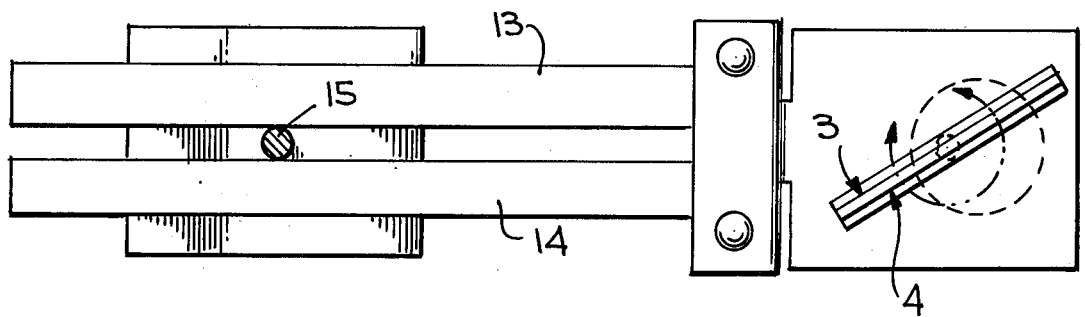
FIG. 5 is a top-plan view taken along lines 5—5 of the system illustrated in FIG. 4.
Figure 6:
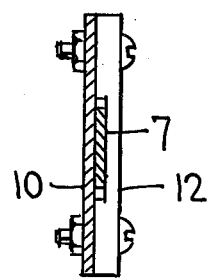
FIG. 6 is a sectional view taken along lines 6—6 of FIG. 4.

An embodiment of the present invention is illustrated in FIG. 4. As shown, planar mirror member 2 is mounted on rod 5 which in turn is attached and rotated by motor 6. Thus, mirror member 2 is rotated about the axis of rod 5.

A camera 8 having a lens 9 is positioned at a location adjacent to the area of mirror member 2. The optical axis of camera 8 is perpendicular to the axis of rod 5. Thus images are reflected off of the two reflective surfaces 3 and 4 of mirror member 2 into camera 8 through lens 9.

Respective mounting brackets are provided for supporting the mirror assembly and the camera. Rod 5 and motor 6 are attached to a mounting bracket 7. Camera 8, on the other hand, is attached to a mounting bracket 10. Brackets 7 and 10 are then coupled together through coupling joint 12. Since bracket 7 is merely fixed in a guide slot provided between bracket 10 and coupling member 12, it is possible to adjust the vertical height of mirror member 2 with respect to the optical axis of camera 8.

In order to support the entire assembly, camera 8 can be mounted on top of a tripod or stand 11. The mounting screw 15 which is attached to camera 8 is slidable between arms 13 and 14 of mounting bracket 10. Thus, camera 8 can be moved along its optical axis towards and away from mirror member 2.

Generally in utilizing the present invention, the image reflected off of the reflective surfaces of mirror member 2 covers the entire optical view of camera 8. It is possible, however, for the reflected image to only cover a portion of the optical view of a camera. In this latter situation, it would be possible for the reflective surfaces to only transmit an image to the camera over the lower half of the optical view. In this situation the top half of the optical view would always be viewing images positioned on the other side of the mirror member while the lower half would be viewing images reflected off of the reflective surfaces of the miror member.

Figure 7:
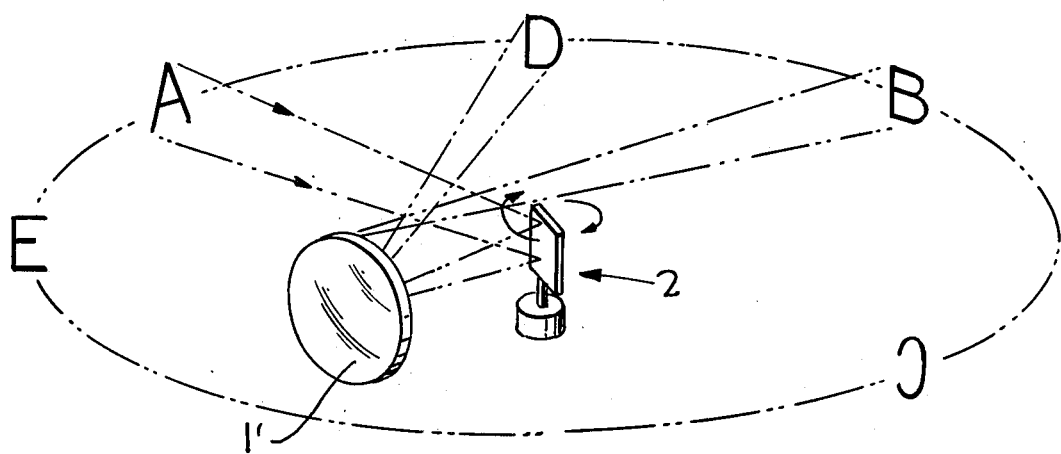
FIG. 7 is a schematic illustration of the operation of a modified embodiment of the present invention.
Figure 8:
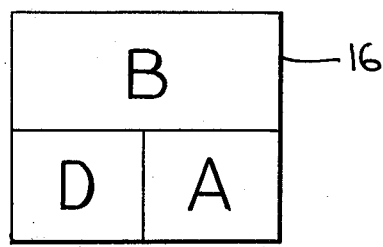
FIG. 8 is an illustration of the image received by the camera in accordance with the operation shown in FIG. 7.

The operation of a modified embodiment of the present invention is explained below with reference to the schematic illustrations of FIGS. 7 and 8. By appropriately selecting the size of the lens of the camera and its spacing from mirror 2, it is possible for the image plane to occasionally reflect three images at once. Thus as shown in FIG. 7, a camera with lens 1' views images at positions A, D and B on image plane 16, as shown in FIG. 8, when mirror 2 is in the position shown. With this embodiment, image B will always be seen by the camera. As mirror 2 rotates, first an object to the left of the camera at position E would be seen in the lower half of its image plane 16. As rotation of the mirror continues, images at A and D are then seen in the lower half with an image from position B still occupying the upper half of the image plane. The same type of situation also occurs when the mirror is reflecting images from the right-hand side of the camera.

With this modified embodiment, it is next to impossible, if not completely impossible, for a person in the area under surveillance to know where the camera is looking. This helps to improve the security protection afforded by the system. For example, a shoplifter cannot believe he is safe by waiting until the camera is facing in the other direction before taking something since he never knows where the camera is looking.

It is noted that the above description and the accompanying drawings are provided merely to present an exemplary embodiment of the present invention and that additional modifications of this embodiment are possible within the scope of the invention without deviating from the spirit thereof.

I claim:

1. Mirror system for use in a panoramic camera scanning system comprising:
   a planar member having reflective coatings on both of its planar surfaces;
   means for rotatably mounting said planar member so that its plane lies along an axis extending in a direction substantially perpendicular to the optical axis of a camera utilized in the scanning system; and,
   means for rotating said planar member about said mounting axis.

2. A system as defined in claim 1 wherein said rotating means continuously rotates said planar member through a full 360° revolution.

3. A panoramic scanning system comprising:
   a camera;
   a planar member having reflective coatings on both of its planar surfaces;
   means for rotatably mounting said planar member so that its plane lies along an axis extending in a direction substantially perpendicular to the optical axis of a camera utilized in the scanning system; and,
   means for rotating said planar member about said mounting axis.

4. A system as defined in claim 3 wherein said camera has a wide-angled lens so that when the plane of said planar member extends in a direction aligned with the optical axis of said camera, said planar member presents no impediment to the optical view of said camera.

5. A system as defined in claim 3 wherein said camera is spaced only a short distance from said mirror.

6. A system as defined in claim 3 wherein when the plane of said planar member extends in a direction perpendicular to the optical axis of said camera the only image viewed by said camera is the reflection from one of said planar surfaces of said planar member.

7. A system as defined in claim 3 wherein when the plane of said planar member extends in a direction perpendicular to the optical axis of said camera, the view reflected by said planar surfaces of said planar member to said camera only covers a portion of the optical view of said camera.

8. A system as defined in claim 3 further comprising further means for mounting said camera, said further mounting means for said camera being coupled to said mounting means for said planar member and said camera being adjustably mounted on said further mounting means such that said camera can be moved in a direction along its optical axis relative to said planar member.

9. A system as defined in claim 3 wherein said rotating means continuously rotates said planar member through a full 360° revolution.

10. A system as defined in claim 3 wherein said camera is a video camera.

* * * * *